United States Patent [19]

Hirao

[11] Patent Number: 5,694,336
[45] Date of Patent: Dec. 2, 1997

[54] DETECTION OF IMPROPER CPU OPERATION FROM LAP TIME PULSES AND COUNT OF EXECUTED SIGNIFICANT STEPS

[75] Inventor: Manabu Hirao, Osaka, Japan

[73] Assignee: NEC Corporation, Tokyo, Japan

[21] Appl. No.: 642,668

[22] Filed: May 3, 1996

Related U.S. Application Data

[63] Continuation of Ser. No. 129,380, Sep. 30, 1993, abandoned.

[30] Foreign Application Priority Data

Sep. 30, 1992 [JP] Japan ..................... 4-261140
Jun. 21, 1993 [JP] Japan ..................... 5-149299

[51] Int. Cl.$^6$ ..................... G06F 11/28; G06F 11/30
[52] U.S. Cl. ................. 364/551.01; 371/62; 395/185.08
[58] Field of Search ..................... 371/61, 62; 364/569, 364/579, 580, 551.01; 395/185.08

[56] References Cited

U.S. PATENT DOCUMENTS

| | | | |
|---|---|---|---|
| 3,749,897 | 7/1973 | Hirvela | 371/16.3 |
| 4,410,938 | 10/1983 | Higashiyama | 371/62 |
| 4,586,180 | 4/1986 | Anders et al. | 371/16.3 |
| 4,594,685 | 6/1986 | Owens | 371/16.3 |
| 4,635,258 | 1/1987 | Salowe | 371/62 |
| 4,727,549 | 2/1988 | Tulpule et al. | 371/62 |
| 4,809,280 | 2/1989 | Shonaka | 371/62 |
| 4,879,647 | 11/1989 | Yazawa | 371/16.3 |
| 4,926,427 | 5/1990 | Remein | 371/62 |
| 5,073,853 | 12/1991 | Johnson | 371/16.3 |
| 5,245,638 | 9/1993 | Gustafson | 364/551.01 |
| 5,303,166 | 4/1994 | Amalfitano et al. | 364/551.01 |
| 5,347,647 | 9/1994 | Allt et al. | 364/551.01 |

FOREIGN PATENT DOCUMENTS 60 005 344  1/1985  Japan.
61 018 045  1/1986  Japan.

OTHER PUBLICATIONS

James W. McCord, "Borland C++ Programmer's Reference", Que Corporation, 1991, Chapter 22, pp. 919–931.

Primary Examiner—Emanuel T. Voeltz
Assistant Examiner—Eric W. Stamber
Attorney, Agent, or Firm—Foley & Lardner

[57] ABSTRACT

In a CPU monitoring apparatus, a lap time pulse, which is generated by the CPU in response to successive executions of a program, is monitored and determined whether its duration is between maximum and minimum values, or longer than the maximum value or shorter than the minimum value, and a program execution alarm signal is generated when the duration is either determined to be longer than the maximum value or shorter than the minimum value. The apparatus further determines whether the CPU has successfully or unsuccessfully executed a predetermined number of significant steps when the CPU has reputedly executed the program a predetermined number of times, and generates a step execution alarm signal if the CPU is determined as having unsuccessfully executed the predetermined number of significant steps.

7 Claims, 8 Drawing Sheets

$V_h$
$V_l$ $V_h'$ time → $t_0$ $t_1$ $V_h$
$V_l$ time → $t_0$ $t_1$ $t_2$

DETECTION OF IMPROPER CPU OPERATION FROM LAP TIME PULSES AND COUNT OF EXECUTED SIGNIFICANT STEPS

This application is a continuation, of application Ser. No. 08/129.380 filed Sep. 30, 1993 now abandoned.

BACKGROUND OF THE INVENTION

1. Field of the Invention

The present invention relates to monitoring method and apparatus for determining whether a CPU is operating properly and generating an alarm signal when an abnormal operation is detected.

2. Description of the Related Art

According to a prior art CPU monitoring apparatus, a "watchdog timer" is provided to detect the duration of a watchdog pulse produced by the CPU in response to a timer interrupt during the execution of a program. The watchdog timer includes a counter which increments its count in response to the leading edge of a watchdog pulse. If the CPU is properly executing a program, the duration of the watchdog pulse is normal, and the counter is cleared again in response to the trailing edge of the pulse before the count reaches its maximum. If the CPU is not properly executing the program, the maximum count is reached and the timer generates a carry output to reset the CPU.

However, if the CPU fails to execute some of the steps of a program or loops a portion of the program endlessly, the watchdog timer will be cleared by the CPU prior to the timing at which it will reset the CPU, and hence, the prior art watchdog timer fails to notice such abnormal conditions.

Since the watchdog pulse is generated only when the timer interrupt routine is executed, it provides no information on the status of execution of each step of the main and timer interrupt routines. Therefore, abnormal execution of a program such as skipping of steps cannot be detected. In addition, data entry errors would cause the CPU to momentarily proceed through wayward paths and abruptly return to the intended paths. There is a further need to discover such a temporary waywardness of the central processing unit.

SUMMARY OF THE INVENTION

It is therefore an object of the present invention to provide a CPU monitoring apparatus capable of detecting abnormal conditions of a CPU not previously detected by the prior art watchdog timer.

The central processing unit, which is monitored by the monitoring apparatus of the present invention, repeatedly executes a program containing a plurality of significant steps and produces a lap time pulse having leading and trailing edges corresponding respectively to successive executions of the program. According to the present invention, the monitoring apparatus monitors the lap time pulse and determines whether the duration of the lap time pulse is between maximum and minimum values, or longer than the maximum value or shorter than the minimum value, and generates a program execution alarm signal when the duration is either determined to be longer than the maximum value or shorter than the minimum value. The apparatus further determines whether the CPU has successfully or unsuccessfully executed a predetermined number of the significant steps when the CPU has repeatedly executed the program a predetermined number of times, and generates a step execution alarm signal if the CPU is determined as having unsuccessfully executed the predetermined number of significant steps.

BRIEF DESCRIPTION OF THE DRAWINGS

The present invention will be described in further detail with reference to the accompanying drawings, in which.

DETAILED DESCRIPTION

Figure 1:
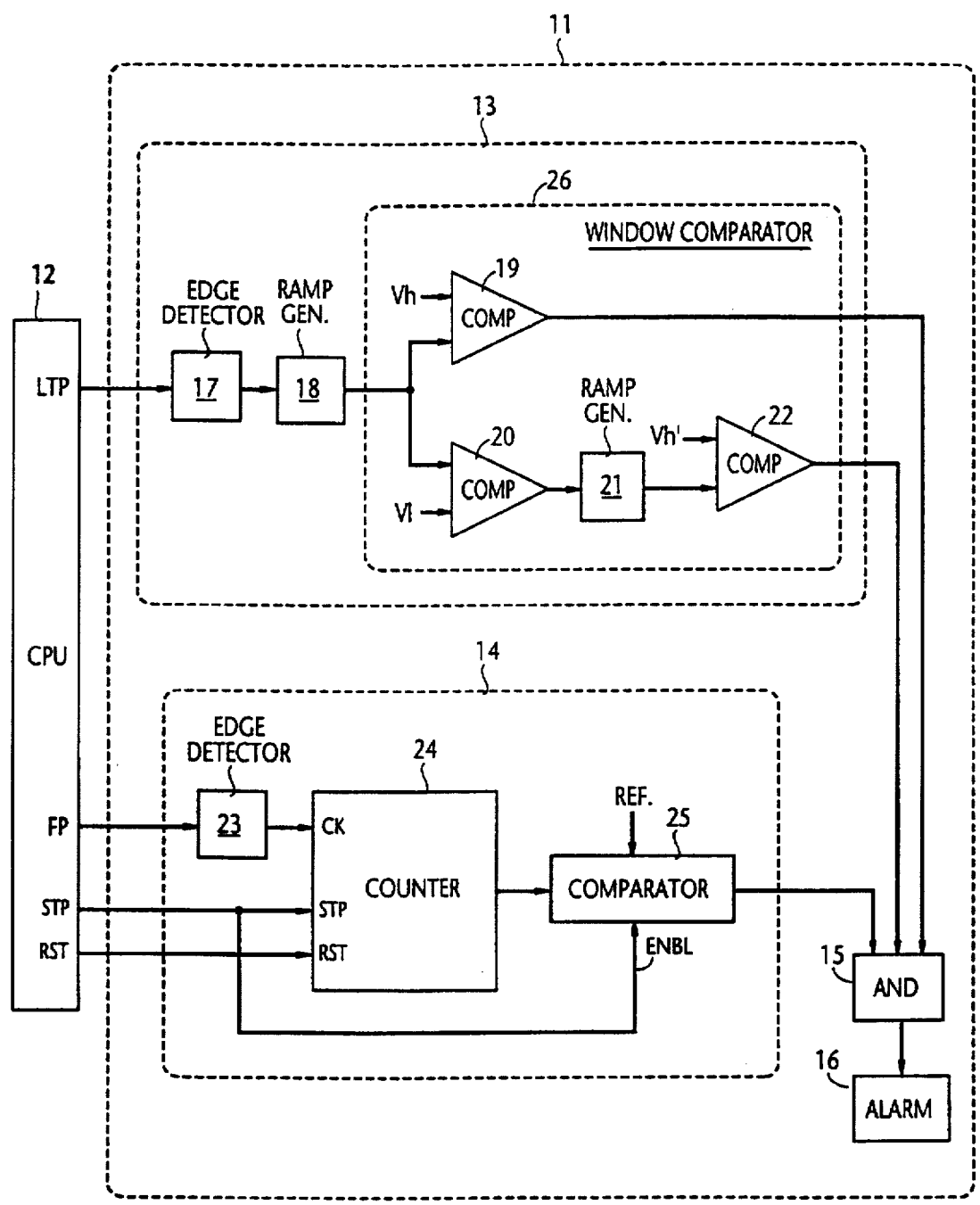
FIG. 1 is a block diagram of an embodiment of the CPU monitoring apparatus of the present invention.

Referring now to FIG. 1, there is shown a CPU monitoring apparatus 11 which monitors a central processing unit 12 of a computer. The CPU 12 repeatedly executes a program and generates a lap time pulse by placing a logic 1 to the lap time port (LTP) at the beginning of an execution of the program and piecing a logic 0 to the LTP port at the beginning of a subsequent execution of the program. Therefore, the leading and trailing edges of the lap time pulse coincide respectively with the beginning of successive executions of a program. The monitoring apparatus 11 comprises a program execution diagnostic circuit 13 and a step execution diagnostic circuit 14. The program execution diagnostic circuit 13 monitors the duration of the lap time pulse LTP and generates a program execution alarm signal when the monitored duration falls outside of a nominal range. The step execution diagnostic circuit 14 counts a flag pulse FP generated by the CPU 12 each time it executes a flag setup step located at a significant point of the program and generates a step execution alarm signal when the count of the flag pulses does not reach a specified value at the time the program is repeatedly executed by the CPU 12 a predetermined number of times. An AND gate 15 is connected to both diagnostic circuits to trigger an alarm 16.

The program execution diagnostic circuit 13 includes an edge detector 17 which generates an edge-triggered pulse in response to each of the leading and trailing edge of the lap time pulse. A ramp generator 18 is connected to the output of the edge detector 17 to generate a ramp voltage which rises gradually in response to the leading edge of a lap time pulse and drops rapidly in response to the trailing edge of the lap time pulse. A window comparator 26 is connected to the ramp generator 18 to generate a program execution alarm signal when the output of ramp generator 18 either exceeds an upper threshold Vh or falls below a lower threshold VI. The window comparator 26 includes an upper-threshold comparator 19 for comparing the output of ramp generator 18 with the threshold Vh and a lower-threshold comparator 20 which compares it with the lower threshold Vl, a second ramp generator 21 for producing a ramp voltage in response to the leading edge of the output of lower-threshold comparator 20, and a second comparator 22 which compares the maximum voltage of the second ramp generator 21 with a threshold voltage Vh'. Each of the comparators 19, 20 and 22 produces a high-level logic output when their input voltage is lower than their respective threshold and switches their output state to low logic level if their input exceeds their respective threshold value. The low-level outputs of comparators 19 and 22 cause the AND gate 15 to generate a low-level alarm signal.

Figure 2A:
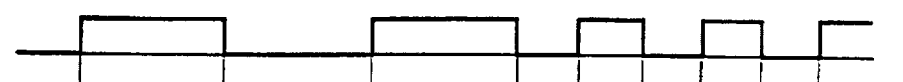
FIGS. 2A to 2G are timing diagrams illustrating signals appealing at various points of the circuit of FIG. 1 when the duration of the lap time pulses is shortened.
Figure 2B:
Figure 2C:
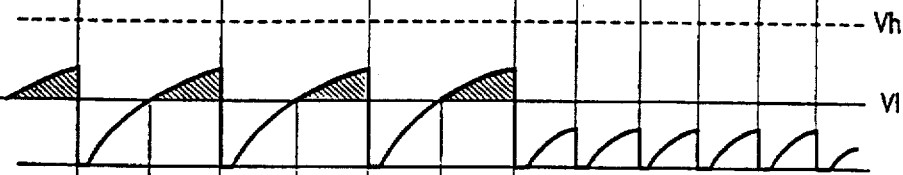
Figure 2D:
Figure 2E:
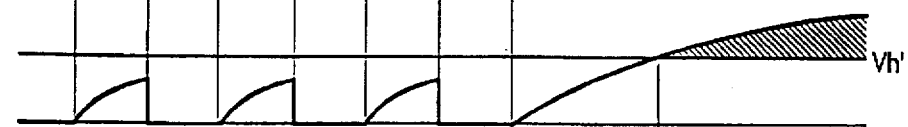
Figure 2F:
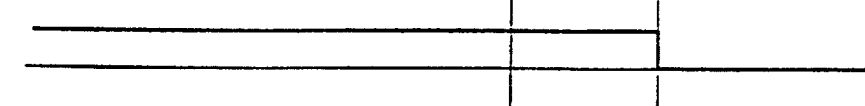
Figure 2G:
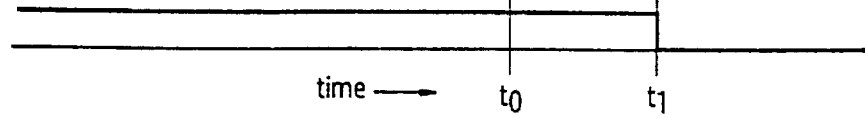

As seen in FIG. 2A, when the lap time pulse has a nominal pulse duration prior to time $t_0$, the output of ramp generator 18 exceeds the lower threshold Vl (FIGS. 2B, 2C) and comparator 20 produces negative-going pulses (FIG. 2D), and comparator 21 generates ramp voltage whose amplitude is lower than threshold Vh' (FIG. 2E), causing comparator 22 to produce a high-level output (FIG. 2F). If the outputs of comparators 19 and 25 are both at high logic level, AND gate 15 maintains a high logic level output as shown in FIG. 2G.

When the lap time pulse starts reducing its duration at time $t_0$, as illustrated in FIG. 2A, there is a corresponding amplitude decrease at the output of ramp generator 18 to a level below the lower threshold Vl (FIG. 2C) and the lower comparator 20 generates a high voltage output immediately in response to the occurrence of the abnormal condition (FIG. 2D). As a result, the output of second ramp generator 21, which responds to the output of the lower-threshold comparator 20, exceeds the threshold Vh' and comparator 22 switches its output logic state to low at time $t_1$ as shown in FIG. 2F, causing a low-level, program execution alarm signal to issue from the AND gate 15 to the alarm 16, as shown in FIG. 2G.

Figure 3A:
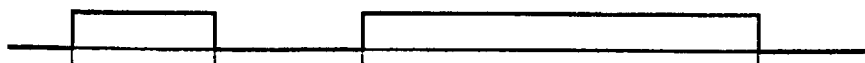
FIGS. 3A to 3E are timing diagrams illustrating signals appearing at various points of the circuit of FIG. 1 when the duration of the lap time pulse is lengthened.
Figure 3B:
Figure 3C:
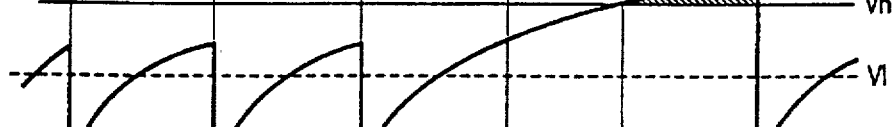
Figure 3D:
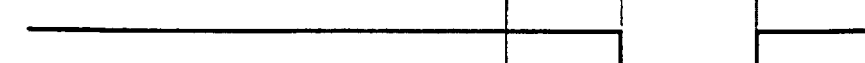
Figure 3E:
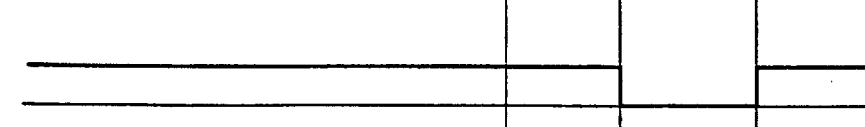

On the other hand, if the lap time pulse starts increasing its pulse duration at time $t_0$, as illustrated in FIGS. 3A, there is a corresponding amplitude increase at the output of ramp generator 18 to a level exceeding the upper threshold Vh at time $t_1$ (FIGS. 3B, 3C) and the comparator 19 generates a low voltage output (FIG. 3D) which lasts from the occurrence of the abnormal condition to the trailing edge of the lengthened lap time pulse. The low level output of the upper comparator 19 cause AND gate 15 to produce a low-level, program execution alarm signal between times $t_1$ and $t_2$ (FIG. 3E) and triggers the alarm 16.

The CPU 12 changes the logic level of a flag pulse port FP as it executes a flag setup step provided in a significant point of the main routine as well as in the timer interrupt routine of the repeatedly running program. The step execution diagnostic circuit 14 comprises an edge detector 25 which responds to each logic reversal at the flag pulse port FP by producing an output pulse. A step counter 24 is connected to edge detector 23 for counting the output of edge detector 23 to produce a step-count signal indicating the number of steps executed by the CPU 12. When the CPU 12 executes a program a predetermined number of times, it supplies a stop command to step counter 24 to hold the step count value. The output of counter 24 is supplied to a step-count comparator 25 which compares it with a reference count. The stop command signal from the CPU 12 is also applied to comparator 25 as an enabling signal to cause it to compare the step-count reached at the time the stop command is issued with the reference count. The counter 24 is subsequently supplied with a reset pulse from the CPU 12 to clear its contents for making a subsequent step-count comparison. If the CPU 12 fails to execute all the necessary steps, the step-count fails to match the reference count and the comparator 25 produce a low level, step execution alarm signal.

Figure 4:
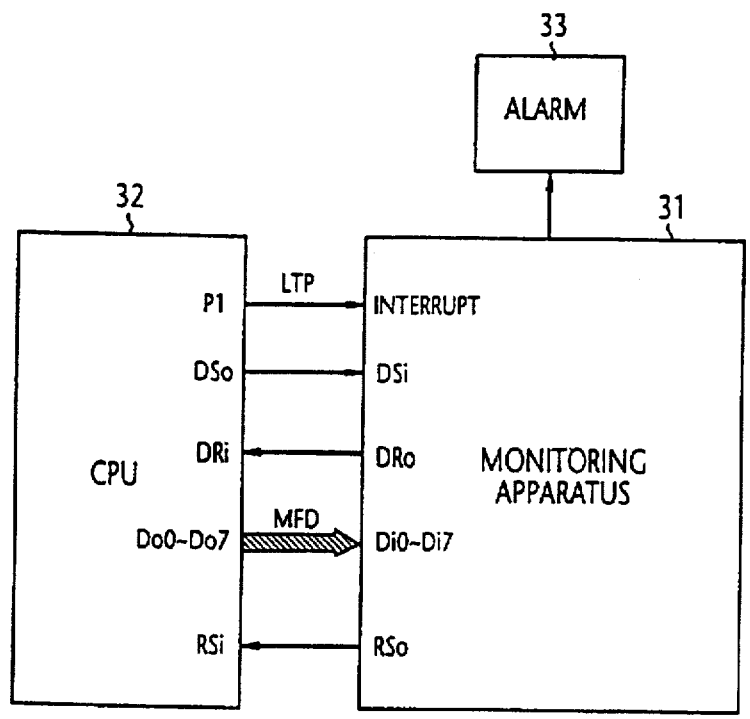
FIG. 4 is a circuit diagram showing interconnections between a modified embodiment of the CPU monitoring apparatus and the CPU.

A modified embodiment is shown in shown in FIG. 4. In this modification, a CPU monitoring apparatus 31 is provided which is operated on a software-based algorithm to monitor a CPU 32 which repeatedly executes a program and generates lap time pulses in a manner similar to CPU 12 of the previous embodiment. The CPU 32 has an output port P1 through which the lap time pulses LTP are supplied to the interrupt port of monitoring apparatus 11, an output terminal DSo for outputting a data set signal DS to apparatus, an input terminal DRI for receiving therefrom a data receive signal DR, MFD (main flag data) output terminals Do0–Do7 for outputting thereof 8-bit main flag data, and a reset input RSI for receiving a reset signal RS from apparatus 11.

Figure 6:
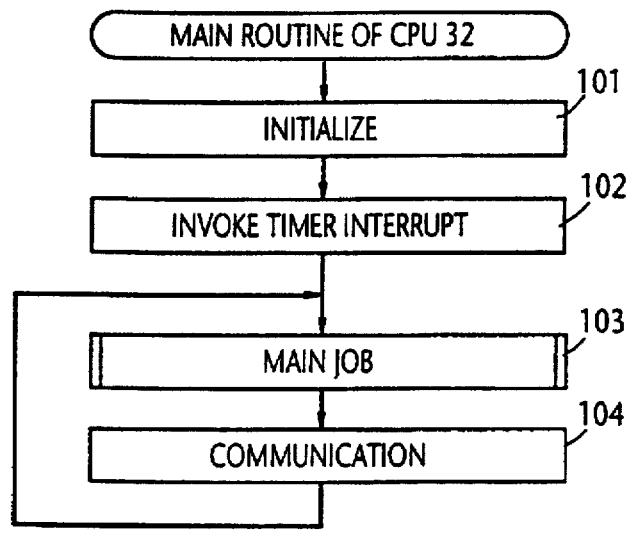
FIG. 6 is a flowchart of the main routine of the CPU of FIG. 4.
Figure 7:
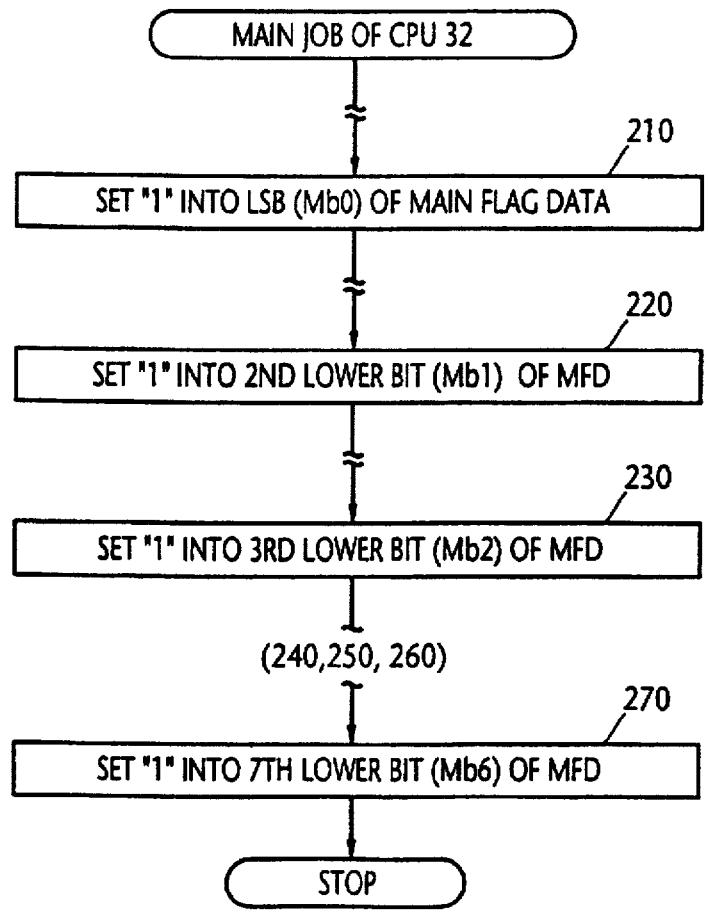
FIG. 7 is a flowchart of the main job of FIG. 6.

As shown in FIG. 6, the main routine of the CPU 32 begins at initialization step 101, which is followed by step 102 in which the CPU 32 causes a timer interrupt routine to be started. At Step 103 that follows, the CPU 32 executes a main job whose significant steps are shown in FIG. 7. As will be described, the CPU 32 transmits main flag data MFD obtained during the execution of step 104 to the CPU monitoring apparatus 31 and returns to step 103.

In FIG. 7, flag setup steps 210, 220, . . . , 270 are provided in significant points of the main job, and the CPU 32 sets a "1" in the bit positions of eight-bit main flag data MFD, starting at the least significant bit, as it executes each of these flag setup steps. More specifically, when the CPU 32 executes flag setup step 210, a "1" is set in the least significant bit Mb0 of the main flag data. Likewise, when it executes flag setup step 220, a "1" is set in the second bit Mb1 of MFD from the least significant position. Thus, when all the flag setup steps are executed, a "1" is set in all of the lower seven positions Mb0 to Mb6 of the 8-bit main flag data. If the CPU 32 fails to execute any one of the flag setup steps, one of the lower significant seven bits of the main flag data remains set to "0".

Figure 5A:
FIGS. 5(A) - 5(D) are timing diagrams of signals appearing in the circuit of FIG. 4.
Figure 5B:
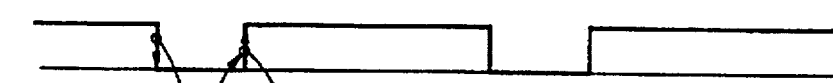
Figure 5C:
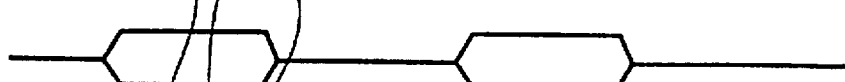
Figure 5D:
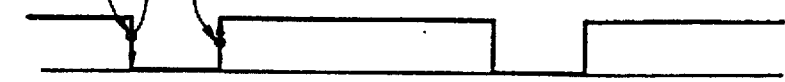
Figure 8:
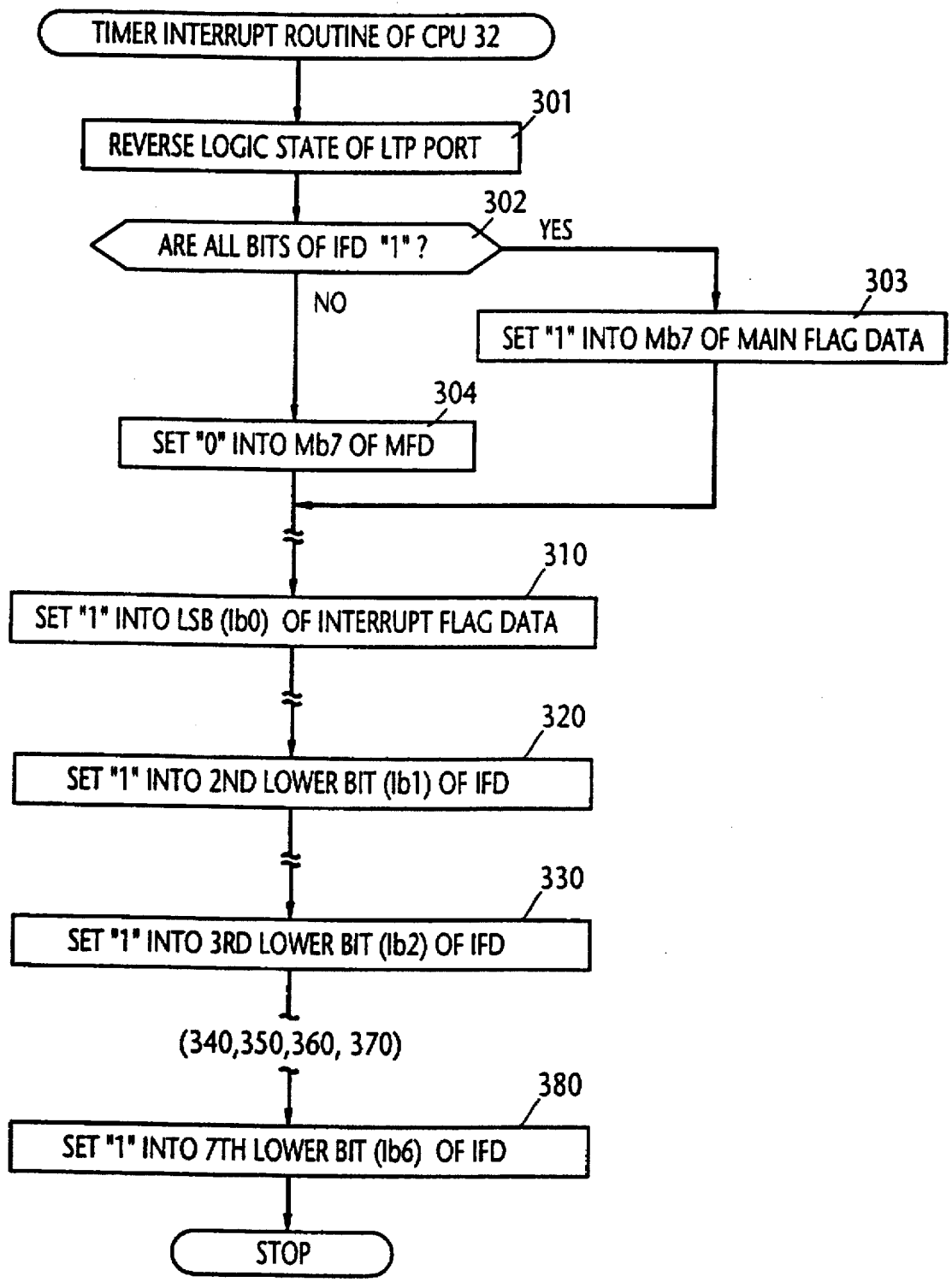
FIG. 8 is a flowchart showing a timer interrupt routine of the CPU of FIG. 4.

At the end of execution of the main job, the CPU 32 executes communication step 104. Prior to description of the communications step, it is appropriate to describe details of the timer interrupt routine executed by the CPU 32 with reference to FIG. 8. The CPU 32 includes a timer, not shown, which generates an interrupt pulse at periodic intervals. In response to the interrupt pulse, the CPU 32 leaves the main routine and executes an interrupt routine. At step 301, the logic level at the lap time pulse port LTP is changed as shown in FIG. 5A, so that the leading and trailing edge of a lap time pulse occur in step with the timer clock each time an interrupt routine is invoked. At decision step 302, control checks to see if all bits of an 8-bit interrupt flag data IFD are set to "1". The bits Ib0, Ib1, ..., Ib7 of this interrupt flag data correspond to flag setup steps 310, 320, . . . 380 of the interrupt routine, respectively, and each of these bits is set to "1" when the corresponding flag setup step is executed. Therefore, if it is determined that all of the eight bits of interrupt flag data are set to "1", all the steps of the interrupt routine are successfully executed. In this case, the decision at step 302 is affirmative, and control branches to step 303 to set "1" into the most significant bit Mb7 of the main flag data MFD. If at least one of the bits of the IFD date contains a "0", indicating that a portion of the interrupt routine is not executed, control branches at step 302 to step 304 to set a "0" into the most significant bit Mb7 of the MFD data.

As a result, the main flag data MFD becomes all 1's only when all the steps of the interrupt routine am exactly executed, and contains a "0" if any of the steps of the interrupt routine are not executed. Thus, the 8-bit MFD data indicates whether the flag setup steps 210–270 and 310–380 are all executed or not. In this way, when the program is repeatedly executed by the CPU 32 a predetermined number of times, the main flag date is transmitted to the CPU monitoring apparatus 31 at communication step 104, FIG. 6. Details of communication step 104 are shown at steps 401–402 in FIG. 9.

Figure 9:
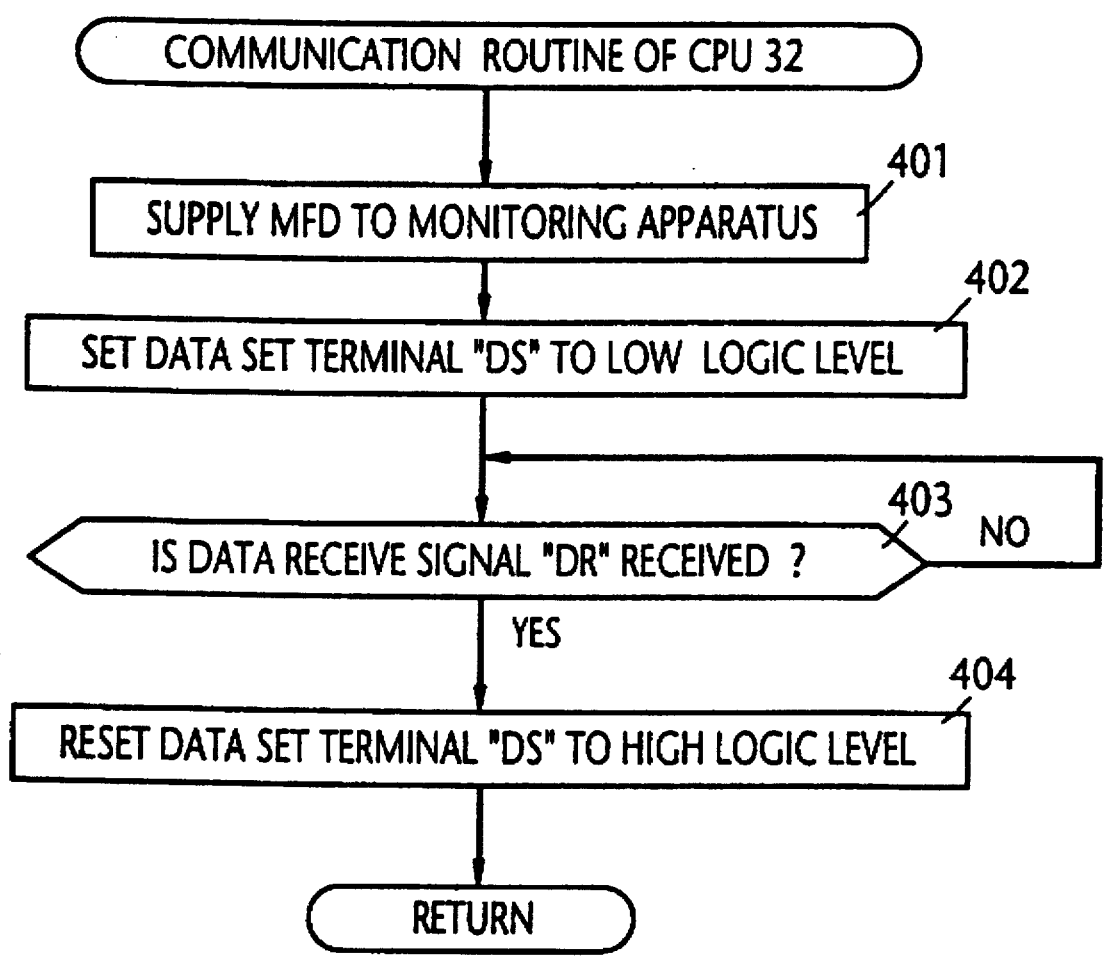
FIG. 9 is a flowchart of a communication routine of the CPU of FIG. 4.

At communication step 401, FIG. 9, the CPU 32 transmits 8-bit main flag date to the date bus via terminals Do0–Do7 as shown in FIG. 5.C. To communicate this fact to the CPU monitoring apparatus 31, the CPU 32 drives the date set output terminal DSo to low logic level (active state) at step 402 as shown in FIG. 513. Since the CPU monitoring apparatus 31 returns a data receive signal DR to the CPU 32 on receiving the main flag data on data input terminals Di0–Di7 (see FIG. 5D) in a manner as will be described, control proceeds to derision step 403 to check to see if a date receive signal is returned from the CPU monitoring apparatus 31. If the answer is affirmative, control branches at step 403 to step 404 to switch the data set terminal DSo to high logic level (nonactive state). In this way, the main flag data MFD is transferred from the CPU 32 to the CPU monitoring apparatus 31 according to the prescribed communication procedure when the CPU 32 has repeatedly executed the program a predetermined number of times.

Figure 10:
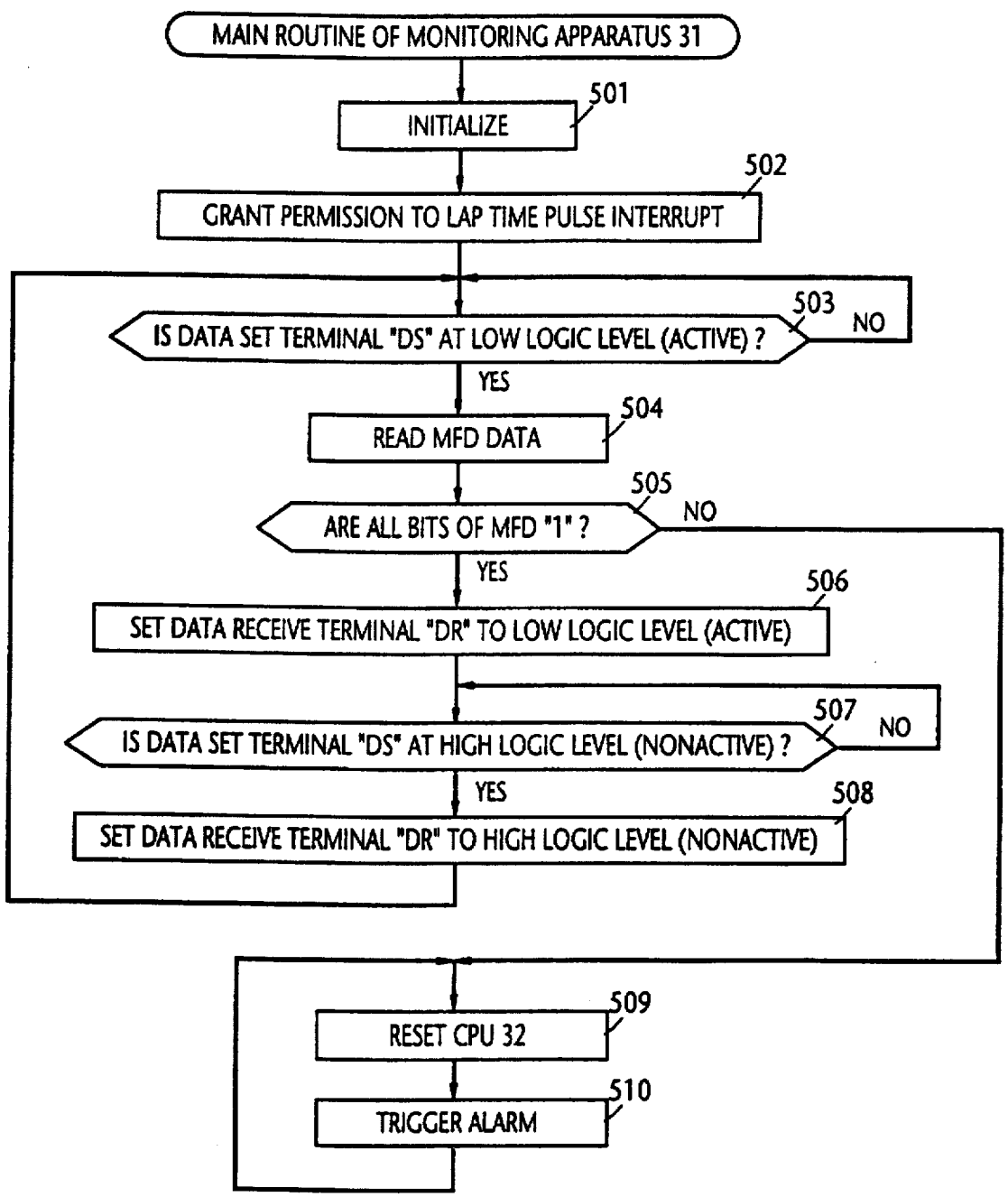
FIG. 10 is a a flowchart of the main routine of the CPU monitoring apparatus of FIG. 4.

FIG. 10 shows the main routine executed by the CPU monitoring apparatus 31. The execution of the main routine starts with initialization step 501, which is followed by step 502 to grant permission to allow a lap time pulse (LTP) interrupt to be executed. At step 503, the data set terminal DS is checked to see if it is active or not. If the answer is affirmative, control branches at step 503 to step 504 to read the main flag data supplied from the CPU 32. Exit then is to decision step 505 to determine whether the MFD is all 1's, i.e., whether all the steps of the main and timer interrupt routines are properly executed. In this embodiment, the determination is not based on direct comparison of the step count with the nominal value, but instead the number of bits 1's contained in the main flag date. Since the presence of a "1" in each bit position indicates whether the corresponding step is properly executed, the determination on the basis of the contents of the main flag data is equivalent to the direct comparison of the step count with the nominal value.

If the answer at step 505 is affirmative, control branches to step 506 to activate the data receive terminal DR by switching its logic level to low. In response, the CPU 32 determines, at step 507, whether the data set terminal DS is at low logic level (nonactive). If the answer is affirmative, the CPU 32 branches at step 507 to step 508 to render the date receive terminal DR nonactive by switching its logic state to high level, and returns to step 503, thus completing a communication procedure in cases where there is no abnormal conditions exist in the CPU 32. If the decision at step 505 yields a negative answer, indicating one of the MFD bits is 0, control branches to step 509 to generate a reset signal RS at reset terminal RSo to reset the CPU 32 and activates the alarm 33 at step 510.

Figure 11:
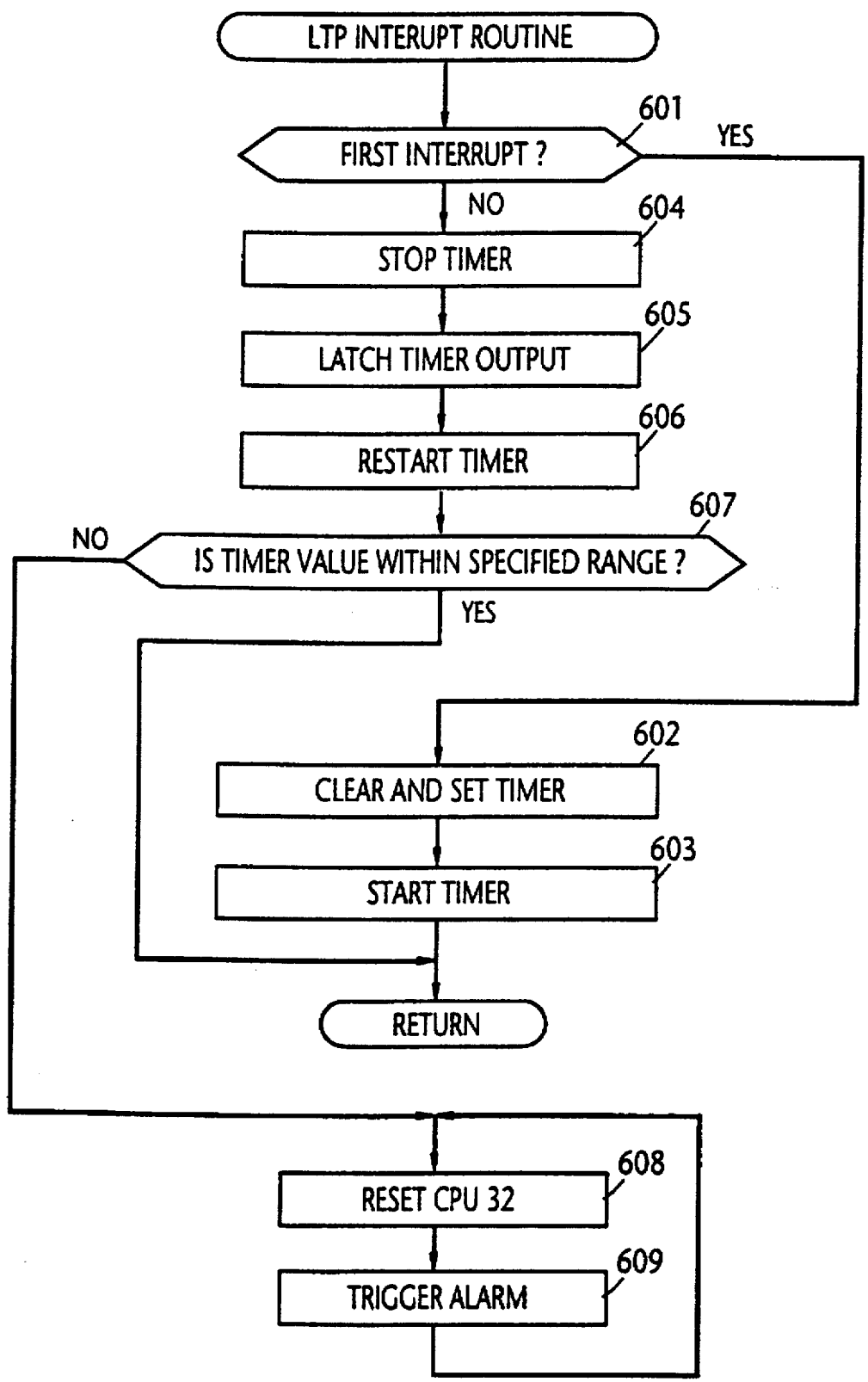
FIG. 11 is a flowchart of a lap time pulse interrupt routine of the CPU monitoring apparatus of FIG. 4.

The CPU monitoring apparatus 31, on the other hand, executes a lap time interrupt routine, shown in FIG. 11, in response to receipt of a lap time pulse LTP from the CPU 32. The lap time interrupt routine begins at decision step 601 to check to see if the execution of the lap time interrupt is the first to perform. If the answer is affirmative, control branches to step 602 to clear and set the timer and then start the timer at step 603. If the answer is negative at step 601, control branches to step 604 to stop the timer and latches the contents of the timer at 605, and then restarts it at step 606. At decision step 607 that follows, control determines whether the duration of the lap time pulse, as indicated by the latched value of the timer, is within a specified range. If no abnormal condition exists in the CPU 32, the decision at step 607 yields an affirmative answer and control returns to the main routine. Otherwise, control branches to step 608 to reset the CPU 32 by applying a reset pulse to it via the terminal RSo and activates the alarm 33 at step 609.

What is claimed is:

1. A method for monitoring a central processing unit, said central processing unit performing a main operation and not performing a monitoring operation, said main operation including repeatedly executing a program containing a plurality of significant steps, said central processing unit producing a lap time pulse having leading and trailing edges corresponding respectively to successive executions of said program and producing a step-related signal indicative of whether said significant steps are successfully executed, said method comprising the steps:

receiving said lap time pulse from said central processing unit;

receiving said step-related signal from said central processing unit; and performing said monitoring operation, not performed by said central processing unit, without interrupting said main operation of said central processing unit, said performing step comprising determining whether said lap time pulse has a duration between a maximum value and a minimum value and generating a program execution alarm signal when said duration is determined to not be between said maximum value and said minimum value, examining said step-related signal and determining whether said central processing unit has unsuccessfully executed a predetermined number of said significant steps when said central processing unit has repeatedly executed said program a predetermined number of times, and generating a step execution alarm signal if said central processing unit is determined as having unsuccessfully executed said predetermined number of significant steps and tripping an alarm in response to one of said program execution alarm signal and said step execution alarm signal.

2. A method as claimed in claim 1, wherein
   said step-related signal comprises flag pulses each provided corresponding to execution of each of said significant steps, and
   said examining step comprises
   counting said flag pulses and producing a flag count,
   determining whether said flag count mismatches a reference count when said central processing unit has repeatedly executed said program a predetermined number of times, and
   generating said step execution alarm signal if said flag count is determined to be mismatched with said reference count.

3. A method as claimed in claim 1, wherein
   said main operation produces a multibit signal indicating whether the central processing unit has unsuccessfully executed a predetermined number of said significant steps, and said examining step comprises
   examining said multibit signal and
   generating said step execution alarm signal if said multibit signal indicates that said central processing unit has unsuccessfully executed at least one of said predetermined number of significant steps.

4. A monitoring apparatus for monitoring a central processing unit, said central processing unit performing a main operation and not performing a monitoring operation, said main operation including repeatedly executing a program containing a plurality of significant steps, said central processing unit producing a lap time pulse having leading and trailing edges corresponding respectively to successive executions of said program and producing a step-related signal indicative of whether said significant steps are successfully executed, the apparatus comprising:

means for receiving said lap time pulse from said central processing unit;

means for receiving said step-related signal from said central processing unit; and monitoring means for performing said monitoring operation, not performed by said central processing unit, without interrupting said main operation of said central processing unit, said monitoring means comprising program execution diagnostic means for determining whether said lap time pulse has a duration between a maximum value and a minimum value, and generating a program execution alarm signal when said duration is determined to not be between said maximum value and said minimum value, step execution diagnostic means for examining said step-related signal and determining whether said central processing unit has unsuccessfully executed a predetermined number of said significant steps when said central processing unit has repeatedly executed said program a predetermined number of times, and generating a step execution alarm signal if said central processing unit is determined as having unsuccessfully executed said predetermined number of significant steps and an alarm responsive to said program execution alarm signal and said step execution alarm signal.

5. A monitoring apparatus as claimed in claim 4, wherein said program execution diagnostic means comprises ramp generator means for generating a ramp voltage rising gradually in response to a leading edge of said lap time pulse and decreasing rapidly in response to a trailing edge of said lap time pulse, and window comparator means for comparing an amplitude of said ramp voltage with an upper threshold and a lower threshold and generating said program execution alarm signal when said amplitude of said ramp voltage exceeds said upper threshold or falls below said lower threshold.

6. A monitoring apparatus as claimed in claim 4, wherein said step-related signal comprises a flag pulse provided upon execution of each of said significant steps and an enable signal provided upon execution of said program a predetermined number of times, and said step execution diagnostic means comprises a counter for counting said flag pulse to produce a flag count, and means for comparing said flag count with a predetermined value in response to said enable signal and generating said step execution alarm signal when said flag count is not equal to said predetermined value.

7. A monitoring apparatus as claimed in claim 4, wherein said step-related signal comprises a multibit signal indicating whether said central processing unit has unsuccessfully executed each of said predetermined number of significant steps, and said step execution diagnostic means comprises means for examining said multibit signal and generating said step execution alarm signal if said multibit signal indicates that said central processing unit unsuccessfully executed at least one of said predetermined number of significant steps.

* * * * *